United States Patent [19]

Valentine et al.

[11] Patent Number: 4,522,433
[45] Date of Patent: Jun. 11, 1985

[54] SPHERICAL SEAT FLEXIBLE O-RING COUPLING

[75] Inventors: Gordon A. Valentine, Denver; Edwin J. Gale, Aurora, both of Colo.

[73] Assignee: Stanley Aviation Corporation, Denver, Colo.

[21] Appl. No.: 378,410

[22] Filed: May 14, 1982

[51] Int. Cl.³ .............................................. F16L 35/00
[52] U.S. Cl. ..................................... 285/93; 285/233; 285/261
[58] Field of Search ............... 285/233, 166, 261, 263, 285/270, 348, 234, 93

[56] References Cited

U.S. PATENT DOCUMENTS

| 3,177,017 | 4/1965 | Guildner et al. | 285/270 |
| 3,378,281 | 4/1968 | Smith | 285/261 X |
| 3,540,758 | 11/1970 | Torres | 285/233 |
| 3,596,934 | 8/1971 | DeCenzo | 285/233 X |
| 3,695,644 | 10/1972 | Goldberg | 285/166 X |
| 3,787,079 | 1/1974 | Yorke et al. | 285/233 |
| 4,249,786 | 2/1981 | Mahoff | 285/233 X |
| 4,252,347 | 2/1981 | Weinhold | 285/263 X |

FOREIGN PATENT DOCUMENTS 113042 2/1969 Denmark ............................. 285/261

Primary Examiner—Dave W. Arola
Attorney, Agent, or Firm—LeBlanc, Nolan, Shur & Nies

[57] ABSTRACT

Flexible fluid couplings incorporating spherical seats which permit the interconnected pipe section to move axially and/or articulate relative to each other. O-ring seals in the coupling are protected against pressure induced extrusion. The center of articulation is located in a plane which passes close to the O-ring seals.

9 Claims, 5 Drawing Figures

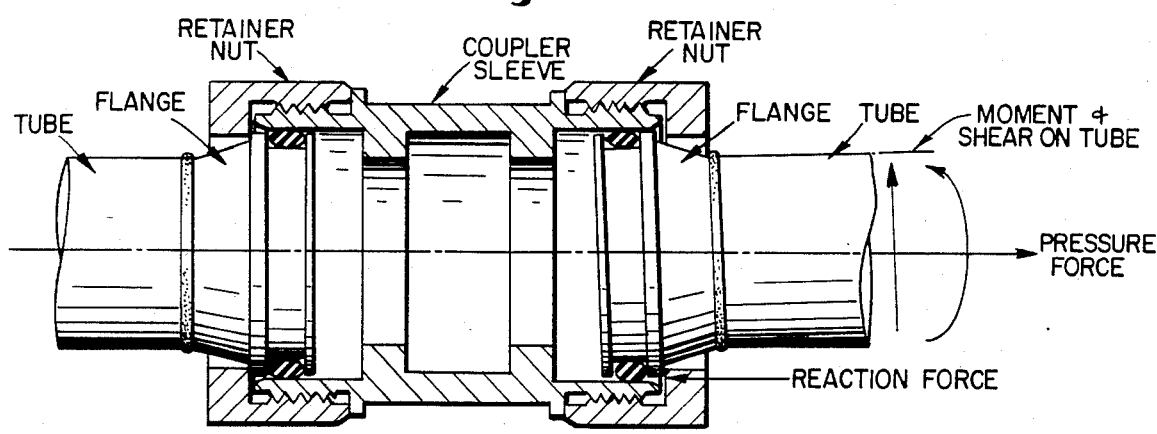
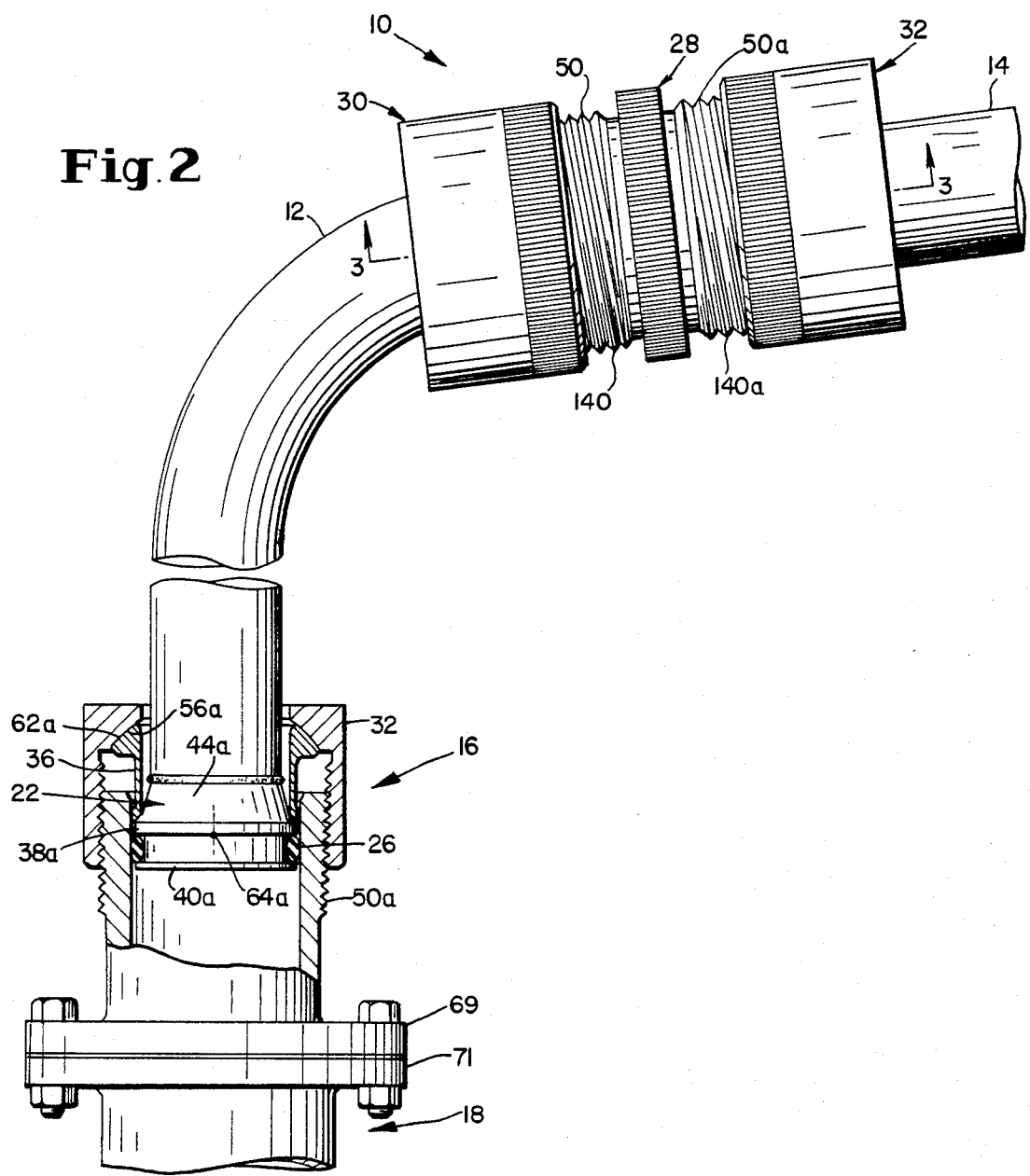

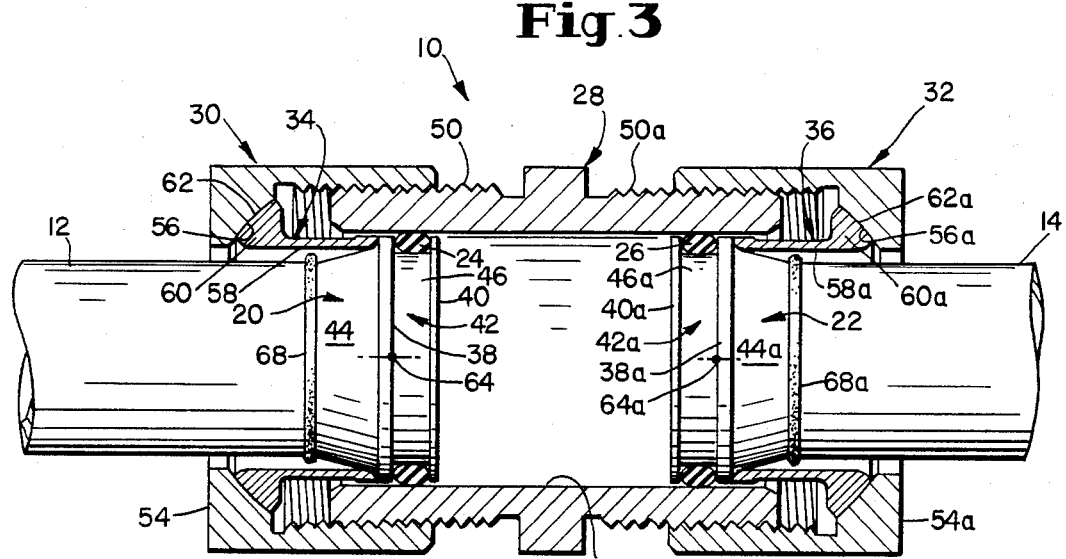
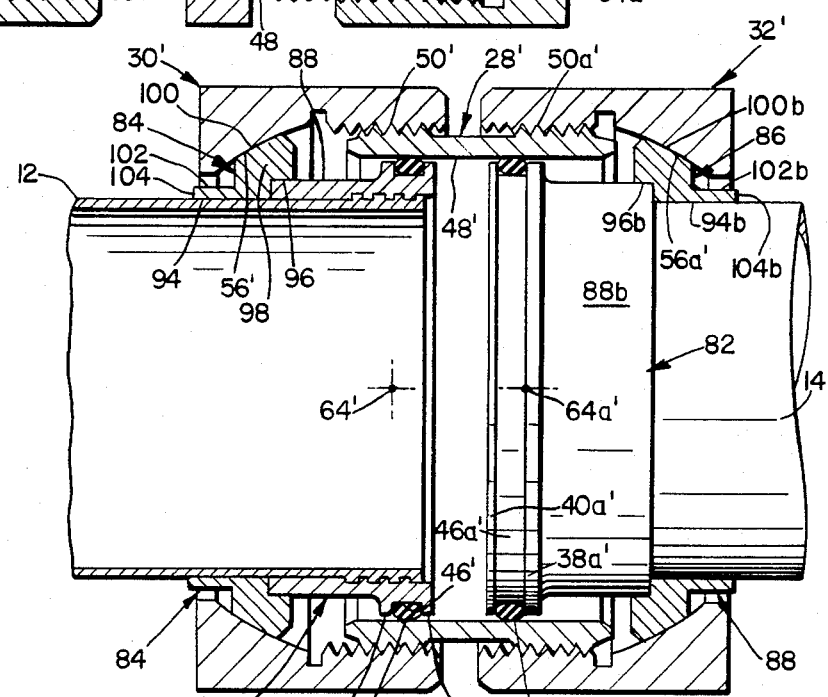
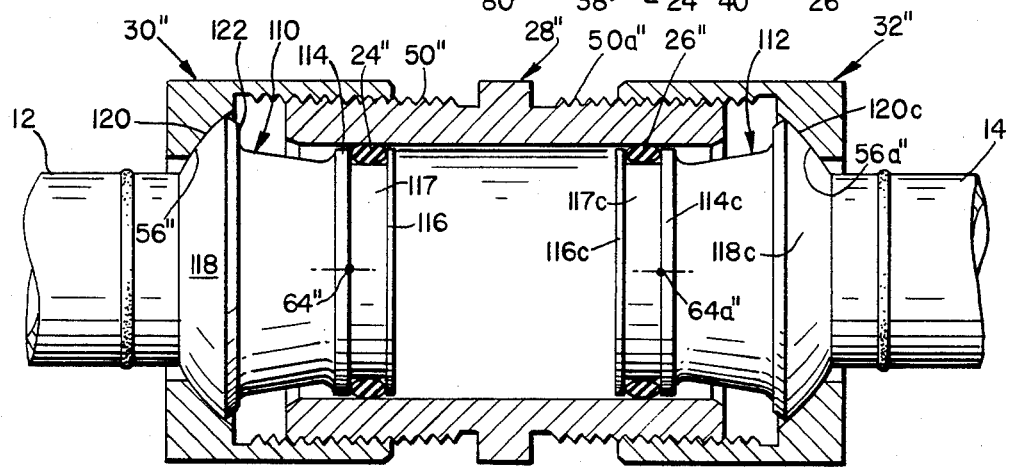

SPHERICAL SEAT FLEXIBLE O-RING COUPLING

FIELD OF INVENTION

This invention relates to fluid-conveying couplings and is particularly concerned with the flexible type of coupling which permits the interconnected pipe or tube sections to move axially and/or to articulate relative to each other.

BACKGROUND

Prior to this invention, flexible couplings of the type described above have been widely used in various applications for coupling pipe or tube sections together in a fluid-conveying system. One such flexible coupling is shown in FIG. 1 of the drawings. Other representative teachings of prior couplings are found in U.S. Pat. Nos. 3,596,934 (issued to H. A. DeCenzo on Aug. 3, 1971), 3,540,758 (issued to J. Torres on Nov. 17, 1970), 4,150,847 (issued to H. A. DeCenzo on Apr. 24, 1979), 3,414,299 (issued to H. D. Roe on Dec. 3, 1968), 3,273,917 (issued to R. O. Chakroff on Sept. 20, 1966), 3,002,771 (issued to R. O. Chakroff on Oct. 3, 1961), 2,714,021, (issued to O. Froidevaux on July 26, 1955), 2,497,441 (issued to J. I. Detweiler on Feb. 14, 1950), 2,212,745 (issued to R. D. McIntosh on Aug. 27, 1940) and 739,707 (issued to W. R. Park on Sept. 22, 1903), as well as Australian Pat. Nos. 130,521 (published on Jan. 18, 1948) and 250,541 (published Jan. 19, 1961).

The prior coupling of FIG. 1 comprises a pair of coupling flanges which are received in a coupler sleeve and which are fixed one to each of the pipe sections to be coupled together. A pair of retainer nuts threaded on the coupler sleeve limit the outward displacement of the coupling flanges and thus retain them within the coupler sleeve. O-rings carried by the flanges are deformed against the inner periphery of the coupler sleeve to establish the leak-preventing seals around the flanges.

When the flanges of the FIG. 1 coupling assembly are aligned in the unpressurized state, the subsequent pressure loads (due to pressurized fluid within the coupling) and the resulting reactions are colinearly related so that no bending moment is imposed on the pipe sections or the flanges themselves. However, when one or both of the coupling flanges are initially misaligned, as commonly occurs in actual installations, an undesirable eccentricity or radial offset develops between the centrally-acting pressure loads and the displaced reactions to objectionable apply a bending moment to the interconnected pipe sections.

The radial offset between the pressure load and the reaction to the pressure load is shown for the right-hand flange in FIG. 1. It will occur because the right-hand flange is angularly misaligned with the coupling sleeve so that when the pressure load pushes the coupling flanges away from each other, the back shoulder of the right-hand flange engages the adjacent retainer nut at a localized region. The pressure loads will therefore be reacted at the localized contact region, thus resulting in a bending moment on the tubing or pipe section and the flange/tubing joint.

The spherical seating construction shown in FIG. 6 and elsewhere of the '934 DeCenzo patent appears to eliminate the pressure-induced bending on the interconnected pipe sections. However, like the prior coupling of FIG. 1, the DeCenzo coupling is susceptible to the pressure-induced extrusion of the elastically deformable seal ring into the clearance between the flange and the coupler sleeve.

In the DeCenzo coupling, the organization and connection of parts are such that the center of articulation for each coupling flange is located axially beyond the end face of each coupling flange. For example, the center of rotation or articulation is located at point "X" in the embodiments shown in FIGS. 1 and 6 of the '934 DeCenzo patent.

Because of the location of DeCenzo's center of articulation, the enlarged, seal-ring confining flange shoulder will swing through a substantial arc as the coupling flange is articulated. A relatively large, radial clearance is therefore required between DeCenzo's coupling flange and the coupling sleeve to permit sufficient articulation of the coupling flange. The larger the clearance between these parts, the greater will be the extrusion of the elastically deformable seal ring into the clearance under the influence of pressurized fluid within the coupling. Extrusion of the seal ring into the clearance may damage the seal ring or otherwise impair the seal between the coupling flange and the coupler sleeve.

Apart from the foregoing problems, none of the prior coupling teachings noted above addresses the problem of utilizing existing flanges of the type shown in FIG. 1 but yet avoiding the objectionable pressure-induced bending on the interconnected tube or pipe sections.

SUMMARY AND OBJECTS OF INVENTION

In solving the foregoing problems, the present invention contemplates a novel flexible coupling assembly which not only eliminates the objectionable, pressure-induced bending on the tubing or pipe sections, but also reduces the extent of extrusion of the elastically deformable O-ring into the clearance space between each coupling flange and the coupling sleeve. The present invention also contemplates a novel coupling construction whereby a non-ball joint type of coupling flange (such as the one shown in FIG. 1) may be utilized without developing bending moments on the tubing or pipe sections.

In the illustrated embodiments of this invention a pair of interengaging, spherically contoured bearing seats form a ball-type joint between each coupling flange and the coupler sleeve to allow articulation of each coupling flange without producing the bending moments mentioned above.

In one embodiment, one bearing seat is integrally formed on a specially constructed coupling flange, and the other bearing seat is formed on the flange retainer nut which is threaded onto the coupler sleeve. In two other embodiments, a conventional non-ball joint type of coupling flange is used in place of the specially constructed coupling flange.

In these latter two embodiments, one bearing seat is formed on the flange retainer nut as before, but the other bearing seat is formed on a specially constructed tubular flange spacer which is interposed between each flange and its retainer nut. The tubular flange spacer of this invention permits utilization of existing coupling flanges such as the one shown in FIG. 1.

In the illustrated embodiments of this invention, the center of articulation or rotation of each coupling flange is located at or in close proximity to a plane transversely intersecting the coupling's longitudinal axis and passing through an edge or other portion of the maximum diameter region of the coupling flange. In the illustrated embodiments, the coupling flange's maximum diameter region is defined by the diametrically enlarged, seal ring-confining flange shoulder.

By locating the coupling flange's center of articulation at or close to the enlarged, seal ring-confining flange shoulder, the shoulder will swing through no more than an insubstantial arc as the coupling flange is articulated. The clearance between the flange shoulder and the coupler sleeve may therefore be reduced substantially without reducing the desired angle through which the flange can be articulated. Reduction of this clearance in turn reduces the extent of extrusion of the flange's elastically deformable seal ring into the clearance under the influence of pressure in the coupling to thus correspondingly reduce extrusion-produced sealing problems.

With the foregoing in mind, the general aim and purpose of this invention is to provide an improved flexible coupling which overcomes the previously described problems of the prior coupling constructions.

A more specific object of this invention is to provide a novel flexible coupling which not only eliminates pressure-induced bending of the interconnecting tubing or pipe sections, but also reduces the extent of pressure-induced extrusion of the seal rings into the clearances between the coupling flanges and the coupler sleeve.

Yet another important object of this invention is to provide a novel flexible coupling construction which permits the utilization of existing coupling flanges of the type shown in FIG. 1 without developing bending moments on the interconnected tubing or pipe sections.

Further objects of this invention will appear as the description proceeds in connection with the below-described drawings and the appended claims.

DESCRIPTION OF DRAWINGS

FIG. 1 is a longitudinal section of a prior art flexible coupling which is not equipped with the ball-type joints of this invention and which illustrates the lateral or radial offset which occurs between the pressure load and the reaction when the coupling flanges are initially misaligned in installation;

FIG. 2 is a partially sectioned elevation of a fluid-conveying pipe or conduit system incorporating the flexible coupling of this invention;

FIG. 3 is a longitudinal section taken along lines 3—3 of the full coupling in FIG. 2.

FIG. 4 is a longitudinal section similar to FIG. 3 and illustrating another embodiment of this invention; and FIG. 5 is a longitudinal section similar to FIG. 3 and illustrating yet another embodiment in which each coupling flange is provided with an integral spherically contoured bearing seat in place of the bearing-defining flange spacer shown in FIG. 3.

DETAILED DESCRIPTION

Referring to FIG. 2, a dual flange coupling assembly 10 is used to couple together a pair of tubular fluid-conveying pipe or tube sections 12 and 14, and a single flange coupling assembly 16 is used for coupling pipe section 12 to a flanged fluid-receiving structure 18. Both of the coupling assemblies 10 and 16 are of the flexible type and incorporate the principles of this invention.

As shown in FIG. 3, coupling assembly 10 comprises a pair of coupling flanges 20 and 22, a pair of elastically deformable O-rings 24 and 26, a coupler sleeve 28, a pair of retainer nuts 30 and 32 and a pair of tubular flange spacers 34 and 36.

Coupling flange 20 is welded or otherwise suitably fixed to pipe section 12, and coupling flange 22 is similarly welded or otherwise suitably fixed to pipe section 14. Coupling flanges 20 and 22 may be of the same construction as the conventional non-ball joint flanges shown in FIG. 1.

Referring to FIG. 3, coupling flange 20 is formed with a pair of parallel, axially spaced apart, annular flange shoulders 38 and 40 which extend radially from an enlarged diametered end section 42 of coupling flange 20. The diameter of the flange's enlarged end section 42 is substantially greater than the diameter of pipe section 12.

Still referring to FIG. 3, flange shoulder 38 lies at the juncture between the flange's diametrically enlarged end section 42 and a tapered flange portion 44. The tapered portion 44 provides the transition between end section 42 and pipe section 12. As shown, the end of the flange's tapered section 44 remote from flange shoulder 38 is joined to pipe section 12 and has an outside diameter equal to that of pipe section 12. Flange shoulder 40 defines the flange's flat end face. O-ring 24 is seated in an annular, radially outwardly opening groove 46 which is defined by the flange shoulders 38 and 40.

In the illustrated embodiment, coupling flange 22 is of the same construction as coupling flange 20. Accordingly, like reference numerals have been applied to designate like portions of the two coupling flanges except that the reference numerals used for coupling flange 22 have been suffixed by the letter "a" to distinguish them from the reference numerals which are used to identify the various portions of coupling flange 20. As shown, O-ring 26 is seated in the radially outwardly opening annular groove 46a of coupling flange 22. O-rings 24 and 26 are deformed against the inner periphery of sleeve 26 to establish fluid tight seals around flanges 20 and 22, respectively.

Still referring to FIG. 3, the coupling sleeve 28 circumferentially surrounds flanges 20 and 22 and is formed with a uniform internal diameter for defining a fluid flow passage 48 which is in fluid communication with the coupled pipe sections 12 and 14. One end face of coupling sleeve 28 lies in a plane passing through an intermediate region of the tapered flange portion 44. The opposite end face of coupling sleeve 28 lies in a plane passing through an intermediate region of the tapered flange portion 44a.

Retainer nut 30 coaxially receives and is threaded onto an externally threaded end portion 50 of the coupler sleeve 28. Nut 30 extends axially beyond the adjacent end face of coupler sleeve 28 so that it circumferentially surrounds and is radially spaced apart from the pipe connected end of coupling flange 20 and also the adjacent portion of pipe section 12.

The outer end of retainer nut 30 is formed with a radially inwardly extending lip portion 54. Lip portion 54 terminates in a spherically contoured bearing seat or surface 56. Seat 56 is spaced axially beyond the adjacent end face of coupler sleeve 28 and therefore lies externally of coupler sleeve 28. The center of curvature of bearing seat 56 lies on the longitudinal axis of nut 30.

When nut 30 is threaded onto sleeve 28, the center of curvature of seat 56 lies within sleeve 28 along the sleeve's longitudinal axis so that bearing seat 56 faces toward the adjacent end face of sleeve 28 and also toward the tapered end portion of flange 20. As shown, bearing seat 56 circumferentially surrounds and is radially spaced from the end portion of pipe section 12.

Still referring to FIG. 3, flange spacer 34 extends axially between and engages flange shoulder 38 at its inner end and the retainer nut's bearing seat 56 at its outer end. The axial length of flange spacer 34 determines the axial spacing of bearing seat 56 from flange shoulder 38. As will be described in detail shortly, this axial spacing is of substantial importance.

In FIG. 3, flange spacer 34 is formed with a uniformly diametered sleeve portion 58 and an end portion 60 of enlarged cross section. End portion 60 terminates in a spherically contoured bearing seat or surface 62 which interfittingly seats against the retainer nut's bearing seat 56. Bearing seat 62 has a radius of curvature which is the same or substantially the same as that of the bearing seat 56. Each of the bearing seats 56 and 62 is contained in a spherical envelope. Bearing seat 56 circumferentially surrounds bearing seat 62.

When nut 30 is threaded onto coupler sleeve 28 to seat bearing seat 56 against bearing seat 62, flange spacer 34 will be confined between bearing seat 56 and flange shoulder 38. In the positions of parts shown, flange spacer 34 is confined against axial movement relative to the coupling flange 20. Flange spacer 34 coaxially and peripherally surrounds coupling flange 20 at the region extending behind flange shoulder 38. As flange 20 is articulated or angulated relative to coupler sleeve 28, flange spacer 34 will remain coaxial with coupling flange 20 by sliding along the retainer nut's bearing seat 56.

The inside diameter of spacer 34 is substantially greater than the outside diameter of pipe section 12 and is about equal to the outside diameter of the enlarged end of the flange's tapered portion 44 adjacent to shoulder 38. By this construction, spacer 38 is radially spaced from and freely receives pipe section 12 and the flange's tapered portion 44 except where it engages shoulder 38. The coupling parts are so arranged and dimensioned that spacer 34 is spaced from the other coupling parts except where it seats against shoulder 38 and bearing seat 56.

The axial length of flange spacer 34 is pre-selected so that when nut 30 is threaded onto sleeve 28 and drawn up to a position where bearing seat 56 seats against bearing seat 62, the centers of curvature of bearing surfaces 56 and 62 are coincident at point 64 and lie in or at least in close proximity to a plane normally intersecting the longitudinal axis of coupling flange 20 and containing the forwardly facing, groove delimiting edge of flange shoulder 38. The diameter of flange shoulder 38 is greater than the diameter of any other portion of coupling flange 20. Flange shoulder 38 therefore represents the maximum diameter region of coupling flange 20 within coupler sleeve 28. By locating the articulation center 64 along the edge of flange shoulder 38, shoulder 38 will swing through no more than an insubstantial arc as the sub-assembly of flange 20 and spacer 34 is articulated about center 64. The radial clearance between shoulder 38 and sleeve 28 may therefore be made very small without reducing the desired angle through which the flange can be universally articulated. The small clearance between shoulder 38 and sleeve 28 advantageously reduces the extent to which O-ring 24 can be extruded into the clearance by fluid pressure in coupler sleeve 28. Furthermore, the ball-type joint created by bearing seats 56 and 62 prevents the development of the previously mentioned bending moments when coupling flange 20 is initially misaligned with coupler sleeve 28 in the installation of the coupling.

From the description thus far, it will be appreciated that bearing seats 56 and 62 are located outwardly from and hence beyond the confines of coupler sleeve 28. This arrangement has two significant advantages. First, it permits the center of articulation 64 to be located at flange shoulder 38 without compromising on the bearing seats' radius of curvature, thereby gaining the advantage of locating the center of articulation at shoulder 38, but yet providing the bearing seats with a relatively large radius of curvature. Second, the sizes or areas of bearing seats 56 and 62 are not restricted by coupler sleeve 28 so that within limitations they may be made as large as desired without regard to the size or dimensions of coupler sleeve 28.

The arrangement and dimensions of parts are such that flanges 20 and 22 are each capable of limited axial displacement in coupler sleeve 28 in addition to being articulatable. Pressurized fluid flowing through the coupling normally urges flanges 20 and 22 axially apart to their illustrated limiting positions where they are axially spaced apart by a maximum distance. In these limiting position, flange spacer 34 seats against bearing seat 56 at one end and flange shoulder 38 at the other end, and flange spacer 36 likewise seats against bearing seat 56a and flange shoulder 38a.

If flange 20 is moved axially inwardly from its illustrated limiting position for a horizontally oriented coupling, flange spacer 34 will be supported on flange 20 to lie loosely between bearing seat 56 and flange shoulder 38. For such a condition, an annular shoulder 68 at the juncture between flange portions 44 and 45 may be built up if desired to support flange spacer 34 in a position where it remains generally coaxial with flange 20.

If flange 22 is moved axially inwardly from its illustrated limiting position, it also will lie loosely between bearing seat 56a and flange shoulder 38a, and it too may be supported on the built up shoulder 68a.

As shown in FIG. 3, the construction of flange spacers 34 and 36 are the same. Likewise, retainer nuts 30 and 32 are also of the same construction, and the right-hand portion of coupler sleeve 28 is the mirror image of the previously described left-hand portion of the coupler sleeve. Accordingly, like reference numerals have been applied to designate like portions of these parts except that the reference numerals for flange spacer 36, retainer nut 32 and the right-hand portion of coupler sleeve 28 have been suffixed by the letter a to distinguish them from the reference numerals used for flange spacer 34, retainer nut 30 and the left-hand portion of coupler sleeve 28.

The arrangement of flange spacer 36 and retainer nut 32 with coupling flange 22 and the coupler sleeve 28 is the same as the previously described arrangement of flange spacer 34 and retainer nut 30 with coupling flange 20 and the left-hand portion of coupler sleeve 28. Accordingly, coupling flange 22, which is slidably received in sleeve 28 is capable of universal articulation through a limited angle about its center of articulation 64a in the same manner that coupling flange 20 is universally articulatable about its articulation center 64.

Coupling assembly 10 is a full coupling, whereas coupling assembly 16 is a half coupling. The construction of the half coupling assembly 16 is the same as the right-hand portion of the full coupling assembly 10 except that the coupler sleeve terminates in a flange 69 which is attached to a mating flange 71 of a fluid-receiving structure. Like reference characters have been applied to designate like portions of the two coupling assemblies.

In the full coupling embodiment shown in FIG. 4, a different form of flange spacer is used with a somewhat different coupling flange configuration. Apart from these differences, the embodiment of FIG. 4 is essentially the same as FIG. 3. Accordingly, like reference characters have been used to identify like parts except that the reference characters used in FIG. 4 have been primed to distinguish them from the reference characters used in FIG. 3.

In addition to the coupler sleeve 28', seal rings 24' and 26' and the two coupling flange retainer nuts 30' and 32', the flexible coupling of FIG. 4 comprises a pair of coupling flanges 80 and 82 and a pair of flange spacers 84 and 86. Flanges 80 and 82 are slidably received in coupler sleeve 28'.

Coupling flange 80 coaxially receives and is fixed to pipe section 12. Coupling flange 82 similarly coaxially receives and is fixed to pipe section 14.

Coupling flange 80 differs from coupling flange 20 in that it is formed with a uniformly diametered sleeve portion 88 in place of the tapered portion which is used in coupling flange 20. Coupling flange 80 is otherwise the same as coupling flange 20. Accordingly, like reference characters have been used to identify like portions of the two coupling flanges except that the reference characters for coupling flange 80 have been primed to distinguish them from those used for coupling flange 20. As shown, flange shoulders 38' and 40' define the annular, radially outwardly opening groove 46', and the elastically deformable O-ring 24' is seated in groove 46' and is deformed against the inner periphery of sleeve 28' to establish a fluid tight seal between flange 80 and sleeve 28'.

Coupling flange 82 is of the same construction as coupling flange 80. Flange 82 is also of the same construction as flange 22 except that flange 82 is provided with a uniformly diametered sleeve portion 88b in place of the tapered flange portion in coupling flange 22. Coupling flange 82 is otherwise the same as coupling flange 22. Accordingly, like reference characters have been applied to designate like portions of flanges 22 and 82 except that the reference characters used for flange 82 have been primed to distinguish them from those used for flange 22. From this description it is clear that flange shoulders 38a' and 40a' define the annular, seal ring-receiving groove 46a', and that seal ring 26' is seated in groove 46a' and is deformed against the inner periphery of sleeve 28' to establish a fluid tight seal between flange 82 and sleeve 28'.

Still referring to FIG. 4, flange spacer 84 is formed with a uniformly diametered bore 94 which coaxially, slidably and interfittingly receives pipe section 12 at the region lying adjacent to the back end face of the coupling flange's terminal sleeve portion 88. At its end adjacent to coupling flange 80, bore 94 is diametrically enlarged to form an annular, axially opening recess 96 which interfittingly receives the rearward end of the coupling flange's sleeve portion 88.

At its end adjacent to coupling flange 80, flange spacer 84 is formed with a portion 98 of enlarged cross section. The outwardly directed peripheral face of portion 98 defines a spherically contoured bearing seat 100. In the positions of parts shown, bearing seat 100 interfittingly seats against and is circumferentially surrounded by bearing seat 56'. Bearing seat 100 has the same or substantially the same radius of curvature as bearing seat 56'. Bearing seats 56' and 100 thus define the ball-type joint between coupler sleeve 28' and flange 80.

The center of universal articulation for the subassembly of flange spacer 84, coupling flange 80 and pipe section 12 lies at point 64' which is at the same location as the articulation center 64 in the embodiment of FIG. 3. The articulation center 64' thus lies in a plane normally intersecting the longitudinal axis of coupling flange 80 and containing the forwardly facing edge of flange shoulder 38' which delimits the seal ring-receiving groove 46'.

As shown in FIG. 4, flange spacer 84 is additionally formed with a terminal sleeve portion 102 extending rearwardly from the flange spacer portion 98 and terminating in an end face 104. The axial length of sleeve portion 102 is pre-selected so that when the flat bottoming annular shoulder of recess 96 is seated against the end face of flange 80, end face 104 will lie flush with the flat end face of retainer nut 30' when nut 30' is threaded sufficiently far onto coupler sleeve 28' to take up any gap between nut 30' and flange spacer 84.

The flushness between end face 104 and the adjacent end face of retainer nut 30' thus provides a visual indication to the installer that bearing seat 56' is seated against bearing seat 100 with the desired degree of snugness. In this position, flange spacer 84' will be held captive between retainer nut 30' and coupling flange 80 and will therefore be restrained against axial displacement relative to flange 80.

Flange spacer 86 is of the same construction as flange spacer 84. Accordingly, like reference numerals have been applied to designate like parts, except that the reference numerals used for spacer 86 have been suffixed by the letter b to distinguish them from the reference numerals used for spacer 84.

The arrangement of sleeve 28', nut 32', flange spacer 86, flange 82 and seal ring 26' is the same as that described for sleeve 28', nut 30', flange spacer 84, flange 80 and seal ring 24'.

Fluid pressure in coupler sleeve 28' normally urges flanges 80 and 82 apart to their illustrated, limiting positions. In the illustrated limiting position of flange 80, the end of flange 80 seats against the internal annular shoulder in flange spacer 84 and bearing seat 100 will be seated against bearing seat 56', so that flange spacer 84 will be held captive between bearing seat 56' and a portion of flange 80. In the illustrated limiting position of flange 82, the end of flange 82 seats against the flange spacer's internal annular shoulder and bearing seat 100b seats against bearing seat 56a' so that spacer 84 is held captive between bearing seat 56a' and a portion of flange 84.

In the embodiment shown in FIG. 5, the tubular flange spacers of the preceding embodiments have been eliminated, and the non-ball joint type flanges of the preceding embodiments have been replaced with a pair of specially constructed ball joint type coupling flanges 110 and 112. The flexible coupling assembly shown in FIG. 5 is otherwise the same as the embodiment of FIG. 3. Accordingly, like reference characters have been applied to designate like parts of the two embodiments except that the reference characters used for the embodiment of FIG. 5 have been double primed to distinguish them from the reference characters used in the preceding embodiments.

Coupling flange 110 is welded or otherwise suitably fixed to pipe section 12, and coupling flange 112 is similarly welded or otherwise suitably fixed to pipe section 14.

Similar to the previous embodiments, coupling flange 110 is formed with a pair of parallel, axially spaced apart annular flange shoulders 114 and 116 at the end of the flange which is slidably received in coupler sleeve 28". Flange shoulder 116 defines the end face of coupling flange 110. Shoulders 114 and 116 extend radially outwardly to define therebetween an annular, radially outwardly opening groove 117 which receives seal ring 24". Ring 24" is deformed against the inner periphery of sleeve 28" to establish a fluid tight seal between flange 110 and sleeve 28".

At a region lying intermediate flange shoulder 114 and the flange end which is fixed to pipe section 12, coupling flange 110 is integrally formed with a diametrically enlarged circumferentially extending portion 118. Flange portion 118 is formed with a spherically contoured circumferentially extending bearing seat or surface 120. Flange portion 118 lies axially outwardly from coupler sleeve 28" and is normally located at a position where bearing seat 120 is circumferentially surrounded by and seats against the retainer nut's bearing seat 56". As shown, bearing seat 120 faces away from coupler sleeve 28".

Still referring to FIG. 5, bearing seat 120 has a radius of curvature which is the same or substantially the same as that of bearing seat 56". Like bearing seat 56", bearing seat 120 is contained in a spherical envelope.

The axial spacing between the enlarged flange portion 118 and flange shoulder 114 is such that the center of curvature of bearing seat 118 lies at the point 64" which as previously explained is along the coupling flange's longitudinal axis in a plane which normally intersects the coupling flange's longitudinal axis and which contains the forwardly facing edge of shoulder 114. This forwardly facing shoulder edge delimits the O-ring-receiving groove 117. When nut 30" is threaded to a position where bearing seat 56" seats against bearing seat 120, the centers of curvatures of the two bearing seats will be coincident at the center point 64". Flange 110 is therefore universally articulatable about center point 64".

Similar to the preceding embodiments, the diameter of flange shoulder 114 is at least equal to the diameter of the end flange shoulder 116 and is greater than the diameter of any other coupling flange portion lying within coupler sleeve 28". Flange shoulder 114 therefore represents a maximum diameter region of the coupling flange 110 within coupler sleeve 28".

By locating center point 64" in the manner described above, flange shoulder 114 will swing through no more than an insubstantial arc as the coupling flange is articulated about center point 64", thereby permitting the clearance between shoulder 114 and the inner periphery of sleeve 28" to be minimized without reducing the angular extent to which coupling flange 110 is universally articulatable. The extent to which O-ring 24" is extrudable by fluid pressure into this clearance in coupler sleeve 28" is therefore reduced.

Still referring to FIG. 5, the enlarged flange portion 118 is formed with a radially extending, axially directed, annular stop abutment shoulder 122 which faces toward the adjacent, flat end face of coupler sleeve 28". Axial displacement of coupling flange 110 relative to the subassembly of retainer nut 30" and coupler sleeve 28" is therefore limited in one direction by abutment of shoulder 122 with the adjacent end face of coupler sleeve 28". Axial displacement of flange 110 in the opposite direction is limited by seating engagement of bearing seat 120 with bearing seat 56".

The advantages associated with locating bearing seats 56" and 120 beyond the confines of coupler sleeve 28" have already been explained in connection with the embodiment shown in FIG. 3.

Coupling flange 112 is of the same construction as coupling flange 110. Accordingly, like reference characters have been applied to designate like portions of the two coupling flanges except that the reference characters used for coupling flange 112 have been suffixed by the letter c to distinguish them from the reference characters used for coupling flange 110.

The arrangement of coupling flange 112 with retainer nut 32", sleeve 28" and seal ring 26" is the same as the previously described arrangement of coupling flange 100 with retainer nut 30", sleeve 28" and seal ring 24". Seal ring 26" seats in the flange's groove 117c and is deformed against the inner periphery of sleeve 28" to establish a fluid tight seal between sleeve 28" and flange 112. Flange 112 is slidably received in sleeve 28" and is universally articulatable about center point 64a".

Pressurized fluid in the coupling of FIG. 5 normally urges coupling flanges 110 and 112 axially apart to their illustrated limiting positions where bearing seat 120 seats against bearing seat 56" and bearing seat 120c seats against bearing seat 56a".

Referring back to FIG. 2, it will be noted that sleeve portion 50 is provided with an extra thread length 140 so that variations in the axial location of flange 20 and pipe section 12 relative to sleeve 28 can be accommodated by threading nut 30 onto the sleeve to an extent which is just enough to eliminate any gap between bearing seats 56 and 62 in the course of installing the coupling. This eliminates the undesirable effect of subsequent movement of pipe section 12 out of sleeve 28 when pressurized fluid is introduced into the pipe and coupling system. After nut 30 is properly positioned on sleeve 28, it may advantageously be locked to sleeve 28 by a lock wire (not shown) or other suitable means to retain it in its proper position on sleeve 28.

Sleeve portion 50a is also provided with an extra thread length 140a which serves the same purpose as the extended thread length 140. Nut 32 also may be locked by a wire (not shown) or other suitable means after it is threaded to its proper position on sleeve 28 where it takes up the gap between bearing seats 56a and 62a.

By threading and locking nuts 30 and 32 on sleeve 28 in the foregoing manner, subsequent introduction of pressurized fluid into the pipe and coupling system will not have the effect of forcing pipe sections 12 and 14 axially outwardly relative to sleeve 28.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A flexible, fluid-conveying coupling for coupling a tubular fluid-conveying part to a further fluid-conveying part in a fluid-conveying system, comprising a sleeve, a tubular flange adapted to be fixed to said tubular fluid-conveying part and extending into said sleeve such that said sleeve circumferentially surrounds a portion of said flange with sufficient clearance to allow radial displacement of said flange relative to said sleeve, an elastically deformable seal ring carried by said flange and deformed between the inner periphery of said sleeve and said flange to establish a seal between said flange and said sleeve, said flange being formed with means for confining said seal ring against axial displacement relative to said flange, and means defining first and second bearing seats lying in seating engagement with one another and located axially beyond said sleeve, said first bearing seat having a diameter larger than the inner diameter of said sleeve thereby preventing said first bearing seat from entering said sleeve, said first bearing seat being operatively connected to said flange and said second bearing seat being operatively connected to said sleeve, said bearing seats providing for universal articulation of said flange relative to said sleeve about a center that lies at least in close proximity to a plane normally intersecting the longitudinal axis of said flange and passing through a pre-selected region of said flange, said pre-selected region lying within said sleeve and having an outer diameter that is at least approximately equal to the outside diameter of any other portion of said flange lying within said sleeve.

2. The flexible fluid-conveying coupling defined in claim 1 wherein said means defining said bearing seats comprises a tubular member and a flange retainer member, said tubular member being formed separately of and circumferentially surrounding said flange, and said tubular member defining said first bearing seat and being free of fixation to said flange, said flange retainer member being mounted on said sleeve and defining said second bearing seat, said second bearing seat being positioned to peripherally surround and seat against said first bearing seat when said flange is disposed in a preselected position in said sleeve, each of said bearing seats being contained in a spherical envelope, and said retainer member acting through said tubular member to prevent dislodgement of said flange from said sleeve.

3. The flexible fluid-conveying coupling defined in claim 2 wherein said means axially confining said seal ring comprises a radially outwardly extending shoulder defining at least a portion of said preselected region and delimiting an annular, radially outwardly opening groove, said seal ring being seated in said groove, and said plane passing through a region of said shoulder and said center.

4. The flexible fluid-conveying coupling defined in claim 3 wherein said shoulder separably abuts one end of said tubular member when said flange is disposed in said preselected position, and wherein said first bearing seat is disposed at the other end of said tubular member such that said tubular member is held captive between said shoulder and said second bearing seat when said flange is disposed in said pre-selected position.

5. The flexible fluid-conveying coupling defined in claim 2 wherein said tubular member and said flange have axially adjacent portions of equal internal diameters receiving said tubular fluid-conveying part.

6. The flexible fluid-conveying coupling defined in either claim 2 or claim 5 wherein said flange retainer member is selectively displaceable relative to said sleeve for moving said second bearing seat into engagement with said first bearing seat, there being coacting means on said retainer member and said tubular member which provides a visual indication that said retainer member has been selectively displaced sufficiently far to bring said second bearing seat into engagement with said first bearing seat.

7. The flexible fluid-conveying coupling defined in claim 1 wherein said first bearing seat is integral with said flange, and wherein a further member is threaded on said sleeve for axial adjustment relative to said sleeve, said further member defining said second bearing seat, said second seat peripherally surrounding and seating against said first bearing seat when said flange is disposed in a pre-selected position in said sleeve, each of said first and second bearing seats being contained in a spherical envelope.

8. A flexible fluid-conveying coupling for coupling a tubular fluid-conveying part to a further fluid-conveying part in a fluid conveying system comprising a sleeve, a tubular flange adapted to be fixed to said tubular fluid conveying part and slidably extending into said sleeve such that said sleeve circumferentially surrounds a portion of said flange, an elastically deformable seal ring carried by said flange and deformed between said flange and the inner periphery of said sleeve to establish a seal between said flange and said sleeve, a tubular member formed separately of said flange and being free of fixation to said flange, and a further member mounted on said sleeve and having a first bearing seat which is contained in a spherical envelope, and said tubular member circumferentially surrounding said flange and having a second bearing seat which is contained in a spherical envelope and which interfittingly engages said first bearing seat when said flange is disposed in a pre-selected position in said sleeve to provide for articulation of said flange relative to said sleeve, said flange being formed with a formation which engages one end of said tubular member when said flange is disposed in said pre-selected position, said second bearing seat being disposed at the other end of said tubular member, said tubular member being held captive between said formation and said first bearing seat when said flange is disposed in said pre-selected position, said tubular member having an intermediate portion extending axially between said one end and said second bearing seat at said other end such that said one end and said second seat are axially remote from one another, said flange engaging said tubular member only at said one end thereof and said first and second bearing seats being disposed axially beyond the confines of said sleeve, said second bearing seat having a diameter larger than the inner diameter of said sleeve thereby preventing said second bearing seat from entering said sleeve and said tubular member being radially spaced from the assembly of said flange and said fluid conveying part at least in the region of said second bearing seat.

9. The flexible fluid-conveying coupling defined in claim 8 wherein said tubular member is axially displaceable relative to said flange when said flange is moved forwardly into said sleeve from said pre-selected position.

* * * * *